United States Patent [19]

Lietar et al.

[11] Patent Number: 5,193,894
[45] Date of Patent: Mar. 16, 1993

[54] APPARATUS AND METHOD FOR CONTROLLING THE LIGHT-RANGE OF MOTOR VEHICLE HEADLIGHTS

[75] Inventors: Christian Lietar, Morges; Jean-Francois Longchamp, Lausanne; Eladio Lopez, Renens, all of Switzerland

[73] Assignee: Robert Bosch GmbH, Stuttgart, Fed. Rep. of Germany

[21] Appl. No.: 904,437

[22] Filed: Jun. 25, 1992

[30] Foreign Application Priority Data

Jul. 8, 1991 [DE] Fed. Rep. of Germany ....... 4122531

[51] Int. Cl.$^5$ .............................................. B60Q 1/06
[52] U.S. Cl. ....................................... 362/66; 362/276
[58] Field of Search ................... 362/66, 71, 285, 286, 362/276, 420

[56] References Cited

U.S. PATENT DOCUMENTS

| | | | |
|---|---|---|---|
| 4,768,135 | 8/1988 | Kretschmer et al. | 362/66 |
| 4,858,080 | 8/1989 | Oikawa | 362/66 X |
| 4,967,319 | 10/1990 | Seko | 362/66 X |

FOREIGN PATENT DOCUMENTS 2333983  1/1975  Fed. Rep. of Germany .

Primary Examiner—Stephen F. Husar
Attorney, Agent, or Firm—Michael J. Striker

[57] ABSTRACT

The apparatus for control of a light-range of headlights of a motor vehicle includes two headlight orientation adjusting devices; at least one electro-optic sensor detecting actual values of light intensities of light reflected from an illuminated portion of the road; and an analyzer/control unit connected to the at least one electro-optic sensor and the adjusting devices to control the adjusting devices and the headlight orientation according to the sensor signal. To maintain the light-range of the headlights regardless of load conditions, the analyzer/control unit contains a memory device for storing data including set values of the light intensities for a desired headlight orientation and for storing other data including actual values of the reflected light intensities for actual headlight orientations when the headlights are set in the actual orientations; a comparator device for comparing the actual values for different actual orientations and the set values for the desired orientations; and a control device for controlling the adjusting devices according to the comparator device to set the headlights in various other actual orientations until the differences between the set values and actual values are minimized to determine the actual orientation closest to the desired orientation.

15 Claims, 1 Drawing Sheet

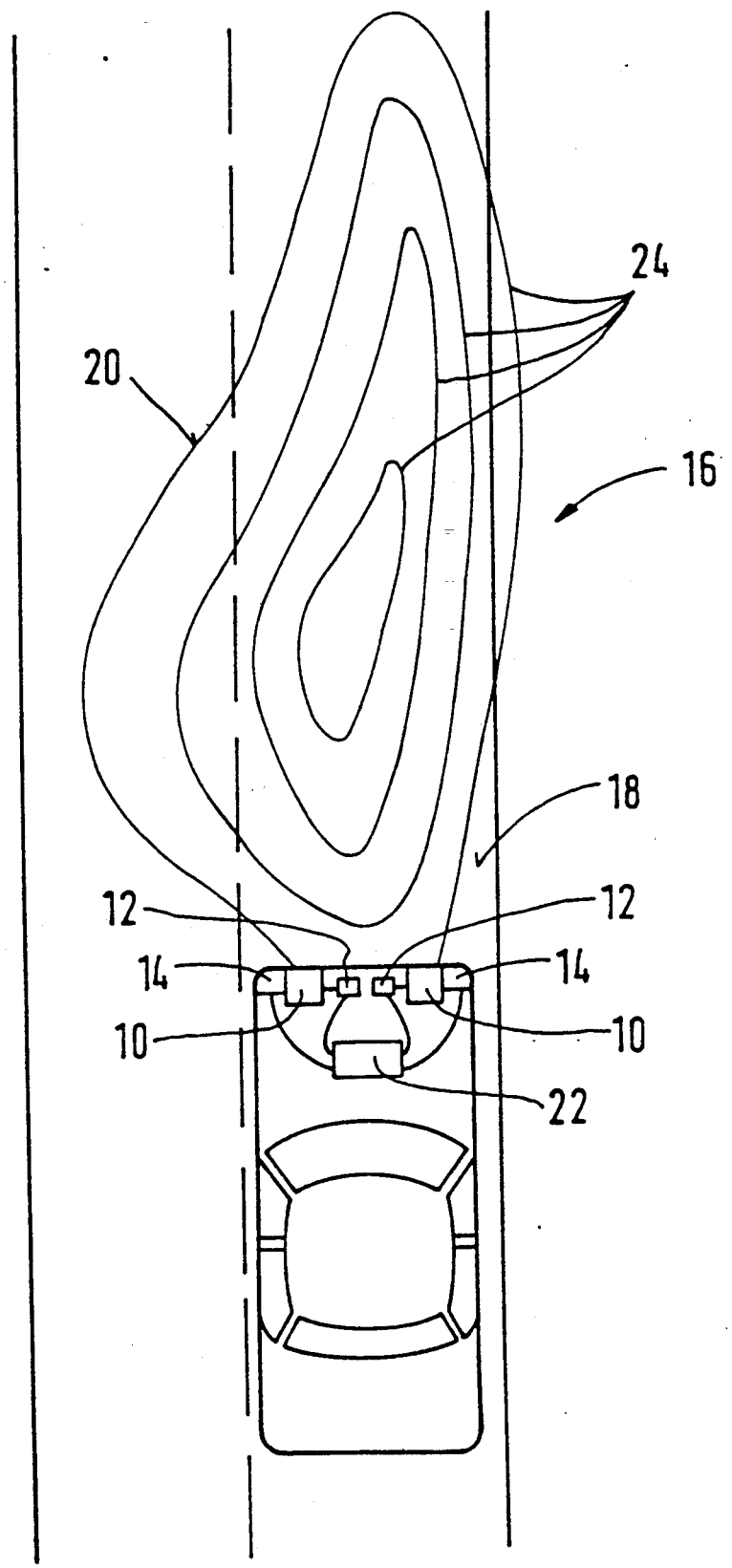

5,193,894

APPARATUS AND METHOD FOR CONTROLLING THE LIGHT-RANGE OF MOTOR VEHICLE HEADLIGHTS

BACKGROUND OF THE INVENTION

The present invention relates to an apparatus and method for controlling the light-range of the headlights of a motor vehicle.

A known apparatus for control of the light-range of the headlights of the motor vehicle includes an adjusting device connected with the headlights, at least one vehicle load condition sensor, and an analyzer/control unit connected to the adjusting device and the at least one load condition sensor. The load condition sensor or sensors detects the load condition of the motor vehicle and sends a sensor signal containing the information regarding the load condition to the analyzer/control unit which then sends a control signal to the adjusting device which adjusts the light-range.

One apparatus of this kind is described in German Published Patent Application 23 33 983. This apparatus has an ultrasonic sensor, by which the distance between the chassis of the motor vehicle and the road is detected. Adjusting devices are connected with the headlights, by which their inclination or angular orientation is controlled. The sensor produces a sensor signal dependent on the distance of the chassis from the road and thus on the load condition of the motor vehicle. In the analyzer/control unit the sensor signal is processed and the adjusting device is controlled by it so that the light-range of the headlights is maintained constant with all the load conditions of the motor vehicle. In this known apparatus however it is presumed that the headlights have a correct base position when the vehicle is not loaded, from which they are adjusted or moved on loading of the motor vehicle. If the base position of the headlights is however incorrectly set when not loaded, an incorrect adjustment of the headlights results when the headlights are reset with the vehicle loaded.

SUMMARY OF THE INVENTION

It is an object of the present invention to provide an apparatus and method for control of the headlight range of the motor vehicle headlights.

This objects and others which will be made more apparent hereinafter is attained in an apparatus for controlling a light-range of headlights of a motor vehicle on a road comprising at least one headlight orientation adjusting device connected with the headlights; at least one sensor detecting at least indirectly a load condition of the motor vehicle and producing a sensor signal depending on the load condition; and an analyzer/control unit connected to the at least one sensor and the at least one adjusting device, the analyzer/control unit receiving the sensor signal from the at least one sensor and controlling the at least one adjusting device and the headlight orientation according to the sensor signal to maintain the light-range of the headlights substantially constant.

According to the invention at least one of the sensors is an electro-optic sensor which measures a state of light reflected from a portion of the road illuminated by the headlights in front of the motor vehicle and from obstacles located thereon; and the analyzer/control unit contains means for storing data including set values representing the state of the reflected light when the headlights are in a desired orientation, means for storing other data including actual values representing the state of the reflected light for an actual orientation of the headlights derived from the sensor signals from the at least one sensor when the headlights are set in the actual orientation; means for comparing the actual values and the set values and for forming differences between them; and means for controlling the at least one adjusting device to set the headlights in at least one other actual orientation repeatedly until the differences between the set values and actual values of the state of the light reflected are minimized to determine the actual orientation of the headlights closest to the desired orientation.

The apparatus according to the invention for controlling the light-range of the headlights of the motor vehicle has the advantage that set values of the state of the reflected light from the illuminated portion of the road with the headlights in the desired orientation are stored in the analyzer/control device so that the accuracy of the headlight adjustment does not depend on the headlights being oriented in the correct position when the vehicle is not under load.

The means for storing data can, of course, be a memory device, the means of comparing set values and actual values can be a comparator device and the analyzer/control device can be a microprocessor having a memory.

In a preferred embodiment of the invention the electro-optical sensor has a plurality of individual light sensitive elements and each of the individual light sensitive elements senses light intensities from a part of the illuminated portion of the reflected light from the road in front of the motor vehicle.

Advantageously in another preferred embodiment of the invention light intensities can be used as actual values representing the state of the light reflected and the means for comparing compares set values of the light intensities with actual values of the light intensities.

In other embodiments of the invention the state of the light reflected is characterized by an illumination boundary of the light reflected and the means for comparing compares set values of the illumination boundary with actual values of the illumination boundary.

In one embodiment the analyzer/control unit contains means for detecting changes in the state of the reflected light due to motion of the motor vehicle over the road and means for compensating for the changes due to motor vehicle motion over the road and in other embodiments it does not contain such means.

In some situations only one electro-optic sensor is necessary. The electro-optic sensor can be attached to the motor vehicle or alternatively it can be connected with the headlight so as to move with it.

BRIEF DESCRIPTION OF THE DRAWING

The objects, features and advantages of the present invention will now be illustrated in more detail by the following detailed description, reference being made to the accompanying drawing in which:

The sole FIGURE is a schematic diagram of an apparatus for controlling the light-range of motor vehicle headlights.

DETAILED DESCRIPTION OF THE PREFERRED EMBODIMENT

Two antidazzle headlights 10 are shown in FIG. 1 mounted on the front end of a motor vehicle chassis.

Two adjusting devices 12, by which the orientation of the headlights 10 is adjusted, and two electro-optic sensors 14 are also mounted on the front end of the chassis. The antidazzle headlights 10 produce a light beam 16 which illuminates the road in front of the motor vehicle. The light beam 16 has a light-dark or illumination border or boundary 20 as prescribed for antidazzle headlights to avoid dazzling or partially blinding the drivers in the oncoming motor vehicle traffic. The antidazzle headlights can have a gas discharge lamp or a filament lamp as light sources. On loading of the motor vehicle the orientation of the chassis and the antidazzle headlights 10 attached to it changes. The position of the light-dark border or illumination boundary 20 also varies so that a partial blinding of the drivers in the oncoming vehicular traffic could occur. To compensate for the change in inclination due to loading the orientation of the headlights 10 is adjusted by the adjusting devices 12.

The adjusting devices 12 and the electro-optic sensors 14 are part of the apparatus for control of the light-range of the headlight 10. The apparatus has moreover an analyzer/control unit 22, which is connected with the sensors 14 and the adjusting devices 12. The sensors 14 can be attached to the chassis of the motor vehicle or to the headlight 10 and thus preform the adjustment of the headlights. Furthermore a electro-optic sensor 14 can be used for the adjusting devices of both headlights.

The sensors 14 are pointed at the portion of the road and the obstacles on it illuminated by the motor vehicles in front of the motor vehicle. The sensors 14 respond to the reflected light from the illuminated portion of the road and the hindrances in the road and form electrical signals dependent on the state of the reflected light, which are fed to the analyzer/control unit 22. The sensors 14 can have focusing optics, by which the incident light is focussed on one or more light sensitive elements, for example photocells. Each portion of the focusing optics with the associated light sensitive elements is associated with a certain part of the region of the road 18 in front of the motor vehicle illuminated by the headlights. The analysis of the reflected light from the illuminated portion of the road and the obstacles present on it can occur according to a photometric or geometric method.

In the photometric method actual values representing light intensities from individual parts of the illuminated region are produced by the electro-optic sensor or sensors. The actual values from various parts of the illuminated region are mapped by the several isointensity lines 24 shown in the drawing, which are lines along which the actual values are equal. Sensor signals for each part of the illuminated region on the road are formed by the sensors and the sensor signals are fed to the analyzer/control unit 22. In the analyzer/control unit 22 set values of the state of the reflected light (or specifically the light intensities) are stored in the form of data, which should be independent of the loading of the motor vehicle. In the analyzer/control unit 22 the actual values representing the state of the reflected light (or specifically the light intensities from the sensors) are compared with the stored data representing the desired or set values and the differences between the actual values and set values of the illumination ratios are formed, according to which the adjusting devices 12 are controlled to eliminate the differences or deviation between actual or set values.

Alternatively, the illuminated region of the road according to a geometric method the position of the illumination boundary, the light-dark border, on the road is detected. The position of the illumination boundary 20 can be determined by observing the strong decrease in light intensity values from parts of the illuminated region in the vicinity of the boundary. The sensors 14 form sensor signals as in the photometric method for each part of the illuminated region of the road 18, which are sent to the analyzer/control unit 22. In the analyzer/control unit 22 the desired or set values of the illumination boundary 20 when the headlights are in the desired orientation can be stored in the form of data, for example in memory locations if the analyzer control unit is a microprocessor. In the analyzer/control unit 22 the actual values for a number of actual orientations of the headlights are compared with the stored data representing the set values for the desired orientation and thus the deviation or differences between the set values and the actual values for the illumination border are determined. Depending on these differences the adjusting devices 12 of the headlights 10 are controlled by the analyzer/control unit 22 so that an actual orientation of the headlights is taken in which the deviation or differences are minimized.

The above-described apparatus for control of the light-range can be operated in a first way or method only in a stationary motor vehicle. The apparatus can be activated by turning on the lights of the motor vehicle. The test of the set up and the adjustment of the headlights can occur as described below. The headlights 10 are moved stepwise by the adjusting devices 12 from one end position to another end position, i.e. between a maximum and minimum inclination of the headlights. This can be performed by a test program in the analyzer/control unit 22, by which the adjusting devices are correspondingly controlled. For each position of the headlights 10 the returning light from the road is registered by the sensors 14 and sensor signals from the sensor 14 are fed to the analyzer/control unit 22 and stored there. After performing the entire adjustment through all stepwise orientation values from maximum to minimum of the headlights 10 the actual values for each individual orientation or position are compared with set or desired values corresponding to the desired position or orientation of the headlights. Then the position or orientation of the headlights in which the deviation between actual and set illumination values is minimized is determined in the analyzer/control unit 22. Then adjusting devices 12 are controlled by the analyzer/control unit 22 so that the headlights are moved to the orientation corresponding to a minimum deviation between actual and desired or set illumination values. The adjusting devices are connected by a feedback connection with the analyzer/control unit to determine the momentary position of the headlights.

Another possibility for a method of testing the set up and adjusting the headlights with the apparatus of the invention is an iterative method. The headlights 10 are moved from a first orientation into a second orientation by the adjusting devices 12, which are controlled by the analyzer/control unit 22. In both orientations the actual illumination values of the light returned from the road are measured and are fed to the analyzer/control unit 22. In the analyzer/control unit the deviation of the actual illumination values from the set or desired values is measured and it is determined whether the deviation of the first or the second orientation is the greater or the lesser. If the deviation decreases from first to second orientation or position, the headlights are moved further in the same direction as the direction from the first to second orientation or position until the deviation begins to increase again so that then the last orientation of the headlights before the increase corresponds to the desired position in which the deviation is minimum. However if the deviation increase from first to second position, the headlights are moved in the opposite direction until they reach the optimal position in an iterative manner.

It is possible with both the above methods to perform adjustment of the orientation of the headlights first with the headlights on the side of the vehicle facing opposing traffic and then with the headlights on the opposite side of the vehicle. The order of the side chosen can of course be reversed.

In another embodiment of the invention the apparatus for control of the light-range of the headlights can be installed so that also it can operate with the vehicle moving, i.e. it can perform a dynamic adjustment of the headlights. The set up and the control of the headlights is advantageously performed with an iterative method as described above in this embodiment. The effect of the condition of the road and the course of the road as the vehicle travels over it must not be considered in adjusting the headlights, so that for example a suppression of these influences on the illumination reaching the sensors must be performed by a suitable electronic circuit in the analyzer/control unit. The electro-optical sensors 14 can also be used for other purposes, for example detection of the edges of the street. Also whether to switch from high beams to low beams or dim light can be determined with the help of the sensors and this switching can be automatically effected by the analyzer/control unit 22.

It will be understood that each of the elements described above, or two or more together, may also find a useful application in other types of constructions differing from the types described above.

While the invention has been illustrated and described as embodied in an apparatus and method for control of the light-range of motor vehicle headlights, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. In an apparatus for control of a light-range of headlights of a motor vehicle on a road comprising at least one adjusting device connected with the headlights, said at least one adjusting device setting and adjusting an orientation of the headlights; at least one sensor, said at least one sensor detecting at least indirectly a load condition of the motor vehicle and producing a sensor signal depending on the load condition; and an analyzer/control unit connected to the at least one sensor and the at least one adjusting device, said analyzer/control unit receiving the sensor signal from the at least one sensor and controlling the adjusting device and thus the headlight orientation according to the sensor signal to maintain the light-range of the headlights substantially constant, the improvement wherein the at least one sensor is an electro-optic sensor such that the at least one sensor detects a state of light reflected from a portion of the road illuminated by the headlights in front of the motor vehicle and from obstacles located thereon; and the analyzer/control unit contains means for storing data including set values representing the state of the reflected light when the headlights are in a desired orientation, means for storing other data including actual values representing the state of the reflected light for an actual orientation of the headlights derived from the sensor signals from the at least one sensor when the headlights are set in the actual orientation; means for comparing the actual values and the set values and for forming differences therebetween; and means for controlling the at least one adjusting device to set the headlights in at least one other actual orientation until the differences between the set values and the actual values are minimized to determine the actual orientation of the headlights closest to the desired orientation.

2. The improvement as defined in claim 1, wherein each of the electro-optical sensors have a plurality of individual light sensitive elements, each of said individual light sensitive elements sensing a part of the reflected light from the illuminated portion of the road in front of the motor vehicle.

3. The improvement as defined in claim 1, wherein the state of the light reflected is determined by light intensity values from individual parts of the illuminated portion of the road in front of the motor vehicle and the means for comparing compares set values of the light intensity with actual values of the light intensity.

4. The improvement as defined in claim 1, wherein the state of the light reflected is determined by an illumination boundary of the light reflected and the means for comparing compares set values of the illumination boundary with actual values of the illumination boundary.

5. The improvement as defined in claim 1, wherein the analyzer/control unit contains means for detecting changes in the state of the light reflected due to motion of the motor vehicle over the road and means for compensating for the changes in the state of the light reflected due to motion of the motor vehicle over the road.

6. The improvement as defined in claim 1, wherein the analyzer/control unit is only working while the motor vehicle stands still.

7. The improvement as defined in claim 1, wherein at least one electro-optic sensor is provided for each headlight.

8. The improvement as defined in claim 1, wherein only one electro-optic sensor is provided for all headlights.

9. The improvement as defined in claim 8, wherein the electro-optic sensor is attached to the motor vehicle.

10. The improvement as defined in claim 8, wherein the at least one sensor moves during an adjusting motion of the headlight with the headlight.

11. The improvement as defined in claim 1, wherein the motor vehicle has two of the adjusting devices connected with the analyzer/control unit and one of the adjusting devices controls ones of the headlights on a side of the motor vehicle closest to the oncoming traffic while the other of the adjusting devices controls others of the headlights on a side of the motor vehicle furthest from the oncoming traffic, and wherein the analyzer/control unit is structured to act on the adjusting devices to first adjust the headlights on the side of the motor vehicle closest to the oncoming traffic and then to adjust the other headlights on the side of the motor vehicle furthest from the oncoming traffic.

12. The improvement as defined in claim 1, wherein the motor vehicle has two of the adjusting devices connected with the analyzer/control unit and one of the adjusting devices controls ones of the headlights on a side of the motor vehicle closest to the oncoming traffic while the other of the adjusting devices controls ones of the headlights on a side of the motor vehicle furthest from the oncoming traffic, and wherein the analyzer/control unit is structured to act on both adjusting devices to simultaneously adjust the headlights on both sides of the motor vehicle.

13. The improvement as defined in claim 1, wherein the means for controlling the at least one adjusting device to set the headlights includes means for controlling the at least one adjusting device to move the headlights through a plurality of the actual orientations from one end orientation to another end orientation to obtain the actual values representing the state of the light reflected in each of the actual orientations.

14. The improvement as defined in claim 1, wherein the means for controlling the at least one adjusting device to set the headlights includes means for controlling the at least one adjusting device to move the headlights iteratively from one orientation to another orientation to sequentially decrease the difference between set values and actual values representing the state of the light reflected until the difference between the set values and the actual values increases thus determining the actual orientation closest to the desired orientation of the headlights.

15. Method of controlling a light-range of headlights of a motor vehicle on a road with an apparatus comprising at least one adjusting device connected with the headlights, said at least one adjusting device controlling the orientation of the headlights; at least one electro-optic sensor, said at least one electro-optic sensor detecting light reflected from a portion of the road in front of the motor vehicle illuminated by the headlights and producing a sensor signal depending on intensities of the reflected light from various parts of the illuminated portion on the road; and an analyzer/control unit connected to the at least one sensor and the at least one adjusting device, said analyzer/control unit receiving the sensor signal from the at least one sensor and controlling the at least one adjusting device and the headlight orientation according to the sensor signal to maintain the light-range of the headlights substantially constant, said method comprising:

a. storing data including set values of the intensities of the reflected light when the headlights are in a desired orientation;
  b. moving the headlights through a plurality of actual orientations with the at least one adjusting device under control of the analyzer/control unit;
  c. storing other data including the actual values of the intensities of the reflected light for the actual orientations of the headlights derived from the sensor signals from the sensor during step b);
  d. comparing the actual values of the intensities for the plurality of actual positions taken in step b) and the intensities for the set values and forming differences between the actual values for each of the actual positions and the set values; and
  e. selecting the actual orientation closest to the desired orientation according to the differences between the actual values and the set values for the actual positions taken in step b).

* * * * *